United States Patent
Privette et al.

(10) Patent No.: US 11,368,448 B2
(45) Date of Patent: *Jun. 21, 2022

(54) PASSWORDLESS PRIVILEGE ACCESS

(71) Applicant: SailPoint Technologies, Inc., Wilmington, DE (US)

(72) Inventors: Ryan Privette, Denver, CO (US); Kris Keller, Cookeville, TN (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,878

(22) Filed: Feb. 22, 2021

(65) Prior Publication Data

US 2022/0086137 A1    Mar. 17, 2022

Related U.S. Application Data

(63) Continuation of application No. 17/023,158, filed on Sep. 16, 2020, now Pat. No. 10,965,665.

(51) Int. Cl.
*G06F 12/00* (2006.01)
*H04L 9/40* (2022.01)
*G06F 12/0802* (2016.01)

(52) U.S. Cl.
CPC ...... *H04L 63/0815* (2013.01); *G06F 12/0802* (2013.01); *G06F 2212/60* (2013.01)

(58) Field of Classification Search
CPC .................................................. H04L 63/0815
See application file for complete search history.

(56) References Cited

U.S. PATENT DOCUMENTS

| | | |
|---|---|---|
| 6,480,847 B1 | 11/2002 | Linenbach |
| 6,765,591 B2 | 7/2004 | Poisson |
| 7,089,585 B1 | 8/2006 | Dharmarajan |
| 7,093,282 B2 | 8/2006 | Hillhouse |
| 7,124,228 B2 | 10/2006 | Grouzdev |
| 7,249,378 B2 | 7/2007 | Wesinger |
| 7,590,074 B1 | 9/2009 | Dondeti |
| 7,890,767 B2 | 2/2011 | Smith et al. |
| 8,099,503 B2 | 1/2012 | Yeates et al. |
| 8,281,129 B1 | 10/2012 | Asghari-Kamrani |
| 8,448,241 B1 | 5/2013 | Kadakia |
| 8,555,403 B1 | 10/2013 | Kilday |

(Continued)

FOREIGN PATENT DOCUMENTS

| | | |
|---|---|---|
| WO | WO 2016133958 | 8/2016 |
| WO | WO 2016138067 | 9/2016 |

OTHER PUBLICATIONS

Notice of Allowance for U.S. Appl. No. 16/100,056, dated Nov. 10, 2021, 5 pgs.

(Continued)

*Primary Examiner* — Jae U Yu
(74) *Attorney, Agent, or Firm* — Sprinkle IP Law Group (57) ABSTRACT

Systems and methods for network security are provided. Various embodiments of the present technology provide systems and methods for an identity security gateway agent that provides for privileged access. Embodiments include a system and method that uses a single sign-on (SSO) (or similar) mechanism to facilitate a user accessing web-based service providers, but separates the assertion and entire SSO process from the user credential.

20 Claims, 4 Drawing Sheets

(56) References Cited

U.S. PATENT DOCUMENTS

| | | |
|---|---|---|
| 8,671,224 B2 | 3/2014 | Bell |
| 8,966,260 B1 | 2/2015 | Walter |
| 9,069,947 B2 | 6/2015 | Kottahachchi |
| 9,098,582 B1 | 8/2015 | Bass |
| 9,152,783 B2 | 10/2015 | Kottahachchi |
| 9,390,255 B2 | 7/2016 | Sharma |
| 9,503,452 B1 | 11/2016 | Kumar et al. |
| 9,654,507 B2 | 5/2017 | Gangadharappa |
| 9,705,919 B1 | 6/2017 | Jacobson |
| 9,699,261 B2 | 7/2017 | Sade |
| 9,882,892 B1 | 1/2018 | Vogel |
| 9,928,839 B1 | 3/2018 | Lester et al. |
| 9,947,008 B1 | 4/2018 | Camacho Diaz |
| 10,122,703 B2 | 11/2018 | Innes et al. |
| 10,229,262 B2 | 3/2019 | Cherukuri |
| 10,262,129 B1 | 4/2019 | Gupta |
| 10,299,118 B1 | 5/2019 | Karachiwala |
| 10,341,316 B2 | 7/2019 | Dvorak |
| 10,965,665 B1 | 3/2021 | Privette |
| 11,240,240 B1 | 2/2022 | Williams |
| 11,303,633 B1 | 4/2022 | Williams |
| 2002/0049883 A1* | 4/2002 | Schneider ............... G06F 21/80 711/100 |
| 2004/0030931 A1 | 2/2004 | Chamandy |
| 2004/0162787 A1 | 8/2004 | Madison |
| 2006/0064600 A1 | 3/2006 | Polichetti |
| 2008/0148349 A1 | 6/2008 | Stevens |
| 2009/0037729 A1 | 2/2009 | Smith et al. |
| 2011/0202982 A1 | 8/2011 | Alexander |
| 2011/0307436 A1 | 12/2011 | Cai |
| 2012/0137131 A1 | 5/2012 | Lu |
| 2015/0067832 A1 | 3/2015 | Sastry |
| 2015/0350186 A1 | 12/2015 | Chan |
| 2016/0094991 A1 | 3/2016 | Powell |
| 2016/0140550 A1 | 5/2016 | Keys |
| 2016/0323273 A1 | 11/2016 | Aufderheide |
| 2016/0342992 A1 | 11/2016 | Lee |
| 2017/0011214 A1 | 1/2017 | Cavanagh |
| 2017/0012969 A1 | 1/2017 | Li |
| 2017/0078275 A1 | 3/2017 | Slovetskiy |
| 2017/0295181 A1 | 10/2017 | Parimi |
| 2017/0310601 A1 | 10/2017 | Yu |
| 2018/0367526 A1 | 12/2018 | Huang |
| 2019/0019184 A1 | 1/2019 | Lacey |
| 2019/0182042 A1 | 6/2019 | Ebrahimi |
| 2020/0019693 A1 | 1/2020 | Zhao |
| 2020/0059881 A1 | 2/2020 | Gupta |
| 2021/0082271 A1 | 3/2021 | Mars |
| 2022/0109675 A1 | 4/2022 | Williams |

OTHER PUBLICATIONS

Notice of Allowance for U.S. Appl. No. 16/100,068, dated Nov. 15, 2021, 10 pgs.

Cisco, "Cisco AnyConnect Secure Mobility Client," retrieved on Aug. 7, 2018, from <<https://www.cisco.com/c/en/us/products/security/anyconnect-secure-mobility-client/index.html>>, 10 pgs.

Wikipedia, "Cloud Computing Security," retrieved on Aug. 7, 2018, from <<https://en.wikipedia.org/wiki/Cloud_computing_security>>, 8 pgs.

Wikipedia, "Network Security," retrieved on Aug. 7, 2018, from <<https://en.wikipedia.org/wiki/Network_security>>, 4 pgs.

Tempered Networks, Inc. Identify-Defined Network (IDN) Architecture, www.temperednetworks.com, 2016, 16 pgs.

Office Action for U.S. Appl. No. 16/100,056, dated Aug. 13, 2020, 28 pgs.

Notice of Allowance for U.S. Appl. No. 17/023,158, dated Nov. 18, 2020, 5 pgs.

Office Action for U.S. Appl. No. 16/100,056, dated Jul. 13, 2021, 14 pgs.

Office Action for U.S. Appl. No. 16/100,068, dated Apr. 28, 2021, 14 pgs.

Office Action for U.S. Appl. No. 16/258,101, dated Aug. 16, 2021, 16 pgs.

Office Action for U.S. Appl. No. 16/258,101, dated Dec. 24, 2021, 17 pgs.

Jianping Pan, et al., "An Overview of DNS-Based Server Selections in Content Distribution Networks," 2003 Elsevier, 2003, pp. 695-711.

Office Action for U.S. Appl. No. 16/258,101, dated Feb. 2, 2021, 17 pgs.

Office Action for U.S. Appl. No. 16/100,056, dated Mar. 10, 2021, 32 pgs.

Notice of Allowance for U.S. Appl. No. 16/100,056, dated Feb. 15, 2022, 2 pgs.

* cited by examiner

PASSWORDLESS PRIVILEGE ACCESS

RELATED APPLICATION(S)

This application is a continuation of, and claims a benefit of priority under 35 U.S.C. 120 of, U.S. patent application Ser. No. 17/023,158 filed Sep. 16, 2020, issued as U.S. Pat. No. 10,965,665, entitled "PASSWORDLESS PRIVILEGE ACCESS," which is hereby incorporated herein for all purposes.

TECHNICAL FIELD

This disclosure relates generally to network security. In particular, this disclosure relates to systems and methods for an identity security gateway agent that provides for privileged access management (PAM). Even more specifically, this disclosure relates to the access/login and credential management of WebUI systems.

BACKGROUND

Electronic devices such as computers, tablets, mobile phones, wearable devices and the like are an integral part of modern life. These electronic devices can be connected through various networks and/or network components which allowing for access and sharing of files or data, communications (e.g., e-mails and video conferencing), and the like between the electronic devices. Many users of electronic devices routinely utilize various types of software applications for business and personal activities. Examples of software applications can include word processors, spreadsheet applications, e-mail clients, notetaking software, presentation applications, games, computational software, and others. In many cases, businesses rely heavily on these devices to meet customer needs.

These networks and/or network components may include a variety of components (e.g., switches, routers, firewalls, repeaters, or other network nodes) which can be arranged to form complicated network topologies that facilitate the exchange of data. Securing the computing and network resources from various threats is important to prevent unauthorized access of data, denial of service attacks, and the like. As such, many businesses have IT departments responsible for deploying, maintaining, and securing the hardware, services, software applications, data, and network components that make up the network infrastructure. For example, network administrators can set in place various security systems and protocols that can include techniques to authorization or denial of access to data or network infrastructure components (hardware or software).

Managing these computing and network resources can be difficult and time consuming, especially for smaller businesses that may not have large IT departments. For example, in many cases, these businesses can use a blend of cloud computing resources along with local network components all which have differing security needs and management issues. As such, there are a number of challenges and inefficiencies created in traditional network security systems.

In the context of accessing services from service providers (e.g., WebUI providers) on a web server, the WebUI providers do not typically reliably or consistently offer the ability to manage user passwords via any machine to machine method (such as representational state transfer (REST), system for cross-domain identity management (SCIM), etc.). Some WebUI providers offer password management via web-based single sign-on (SSO) and identify federation, but common implementations (such as security assertion markup language (SAML)), lack some security features expected in a privilege offering.

There are various approaches that could potentially address the challenges found in the prior art. Some service providers offer some sort of application programming interface (API) (e.g., REST, simple object access protocol (SOAP), SCIM, etc.) to access the service provider's credential store and manipulate a credential. However, typical service providers do not offer any such solution. Some service providers offer a way to create a user, but leave the password set to either SSO or manual management via a password reset function. Typical service providers do not provide a password set/reset function functionality, though.

It would also be possible to update web credentials via user emulation tools. These types of tools would navigate a web page as if they are a human to access the native password reset tools that generally would be used by a user. However, the complexity of setting up such emulation scripts, the dynamic and fluid nature of WebUI development, and the presence of automation prevention (e.g., Captcha, etc.) would pose challenges to this approach.

Some service providers offer credential management via SSO federation. In these examples, credentials are managed via an offsite system such as a dedicated identity provider (such as Octa, PING, Google, etc.), or via a corporate resource (such as active directory federation services (ADFS)). In these examples, the user's browser facilitates authentication by presenting an assertion to a service provider (SP), which was previously obtained from an identity provider (IDP). However, there are some security concerns with this method. Often, a single login to the IDP will provide access to multiple WebUI providers, for an unknown period of time. Once an assertion has been granted to a browser, there would be no way to force the sessions through the privilege provider and some privilege protections such as access logs and session recording may be bypassed.

Therefore, there is a need for passwordless privilege access via an SSO, or similar technologies that provides unique ways to use common SSO protocols offered by WebUI providers, but to retain the security feature set expected in a privilege offering.

SUMMARY

Systems and methods are described that use a single sign-on (SSO) mechanism to facilitate a user (via a browser) accessing webUI service providers, but separates the assertion and entire SSO process from the user credential. Other authentication mechanisms may also be used, such as SAML, open authorization (OAUTH), etc. Some embodiments provide a method to manage a WebUI service provider credential, using existing standards and protocols, but in a unique way that allows the privilege application to retain expected feature sets.

Systems and methods are described for providing privilege access to a client to facilitate connections to target network components. Some embodiments include: an agent component requesting credentials from an identity provider (IDP); receiving the requested user credentials from the IDP; generating abstracted credentials; providing the abstracted credentials to the user device; generating a first request intended for the target network component including the abstracted credentials; generating a second request based on the first request by replacing the abstracted credentials with the user credentials; sending the second request to the target network component; receiving a first response from the target network component, the first response including a session identifier, a response header, and a cookie; generating a second response based on the first response by replacing the session identifier with an abstracted session identifier, the response header with an abstracted response header, and the cookie with an abstracted cookie; and sending the second response to the user device.

Embodiments of the present invention also include computer-readable storage media containing sets of instructions to cause one or more processors to perform the methods, variations of the methods, and other operations described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Generally, the present disclosure describes a system and method that uses a single sign-on (SSO) mechanism to facilitate a user (via a browser) accessing WebUI service providers, but separates the assertion and entire SSO process from the user credential. Other authentication mechanisms may also be used, such as SAML, open authorization (OAUTH), etc. The solution described provides a method to manage a WebUI service provider credential, using existing standards and protocols, but in a unique way that allows the privilege application to retain expected feature sets.

In the disclosed mechanism, the privilege application serves as an identity provider (IDP), and inserts assertions as needed to facilitate authentication (described below). Once the browser is no longer the arbiter of SSO authentication, the privilege application can provide authentication for the user natively. The user may be authenticated via a user's corporate account, a secondary user account dedicated to the user but different from the corporate account, or for a service account, shared by many users, for example.

In some embodiments, the privilege application uses an agent component so that all authentication and session identification information is abstracted to the user and browser. The agent component maintains a mapping of abstracted authentication and session identification information and translates this information from abstracted information to real information and from real information to abstracted information as the requests and responses are proxied through the agent component (described in detail below).

In some embodiments, the privilege application will track and delete the abstracted, persistent, stored identity of the user after SSO authorization to disallow subsequent and parallel connections outside of the privilege application's awareness. By tracking that the stored identity is used only within privileged application initiated sessions and deleting the stored identity upon closure of the privileged application session, we can ensure that all privileged security features (e.g., such as session logging and session recording, etc.) are used. The privileged application tracks windows and tabs of the browser that the privileged application initiates/opens so that the user cannot use the session information in an adjacent window or tab.

This solution provides a method to manage a WebUI credential, using existing standards and protocols, but in a unique way that allows the privilege application to retain the expected feature set.

Before delving into more details regarding the specific embodiments disclosed herein, some context may be helpful. Solutions exist for providing an agent abstraction process used for manipulating user passwords. For example, commonly owned U.S. patent application Ser. No. 16/100, 056, filed Aug. 9, 2018, entitled "IDENTITY SECURITY GATEWAY AGENT", describes systems and methods for an identity security gateway agent that provides for privileged access management (PAM) and cloud access security broker (CASB), and is expressly incorporated by reference herein in its entirety. The present disclosure describes a system and method that has similarities to the referenced system and method, but includes additional novel functions. For example, the presently disclosed system and method enables the manipulation and abstraction of SSO tokens. In addition, the full session is abstracted by abstracting the session identifier (described below), response headers, and cookies, not just the SSO tokens. The presently disclosed system and method also enables the retrieval and injection of unique SSO tokens, abstracted from the user.

Various embodiments of the present technology generally relate to network security. More specifically, some embodiments of the present technology relate systems and methods for an identity security gateway agent that provides for privileged access management (PAM) and cloud access security broker (CASB). With the proliferation of modern computing devices, security continues to be a major issue. Attackers try to penetrate networks, obtain privileged account access, interfere with business activities, collect sensitive information and the like. There are a variety of traditional security options that business can deploy. In fact, many businesses often use multiple of these traditional security options, which are often separate solutions that must be independently maintained and can leave gaps in coverage.

One commonly used solution is PAM. PAM is a broker system that allows system administrators and security engineers to connect, in a secure manner, to a target (e.g., client, router, servers, access points, firewalls, databases etc.). Once the system administrator has access to the target device, the system administrator can setup, deploy, access setting, and perform other actions with the target. PAM systems typically retrieve credentials from a vault and post the credential in-line. The broker system for PAM is often implemented as a gateway solution. Many companies often employ PAM as well as CASB. CASB solutions provide a secondary proxy to a web security gateway to sanction access to cloud applications. Unfortunately, these solutions are not holistically combined and must be maintained separately by the users.

In contrast, various embodiments of the present technology provide an integrated security platform that combines PAM, CASB, identity access management, and multi-factor authentication onto one platform. This integration allows for a frictionless deployment that can be utilized by companies that may not have large teams of system administrators. As such, some embodiments provide a gateway solution and a proxy solution that is easy to deploy. The user equipment (e.g., computer, phone, point of sale terminal, etc.) can be used as a gateway. An agent can be included on each endpoint that combines gateway functionality of PAM and web rewrite and proxy functionality of a CASB deployment into an endpoint solution.

Various embodiments of the present technology provide for a distributive agent that can include one or more of the following features: 1) no listener on any user device; 2) no connectivity required to a centralized appliance; 3) rewriter with PAM for internal web and CASB connection; 4) agents that are identity aware (e.g., tracks HMAC, storage configuration, memory configuration, OS version, etc.) and build identity profiles for machines; 5) provides status on reachability to target systems; 6) provides connectivity to remote desktop protocol (RDP)/SSH/Web UI/CASB; and/or 7) provides secure capture session replay, key logging, password injection into web based applications, and affinity/awareness of agent and plugin with option to disable access to connections if plugin is not available. Some embodiments can use a dedicated TCP layer 4 socket to provide connectivity through user agent to enterprise environment web user interface via a proxy built into the agent. In various embodiments, an agent host can provide connectivity to target systems by enabling connectivity to devices through client side (or host based) VPN.

Figure 1:
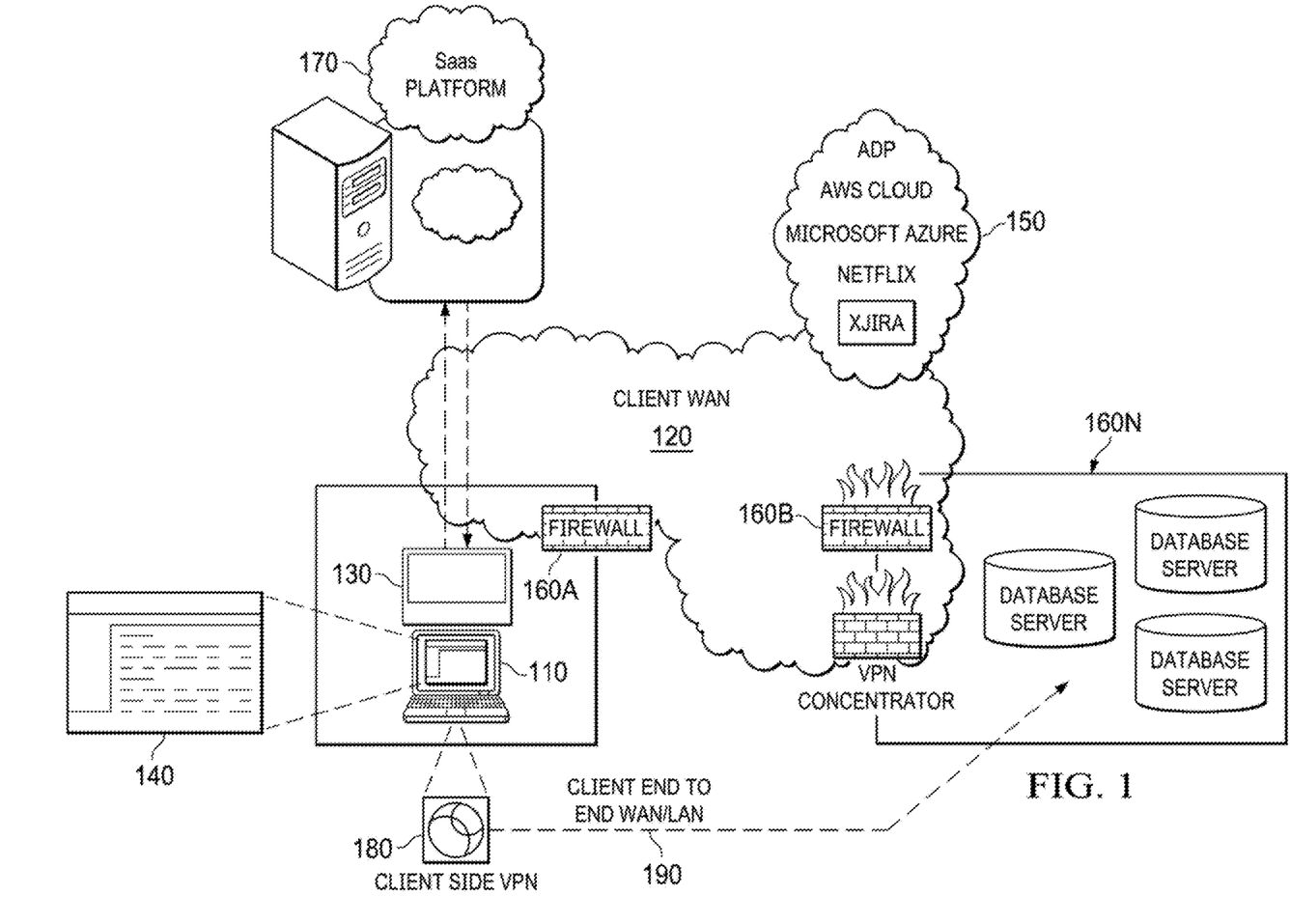
FIG. 1 illustrates an example of an environment which can be used in some embodiments of the present technology.

FIG. 1 illustrates an example of an environment which can be used in some embodiments of the present technology.

In the embodiments illustrated in FIG. 1, environment can include one or more electronic devices 110 on a client wide area network (WAN) 120, an agent (e.g., running on each electronic device 110, or running on another device, such as a server), a portal 140, cloud-based applications in a SAAS environment 150, client networking infrastructure 160A-160N (e.g., firewalls, databases, etc.), and a SAAS platform 170. In the embodiments illustrated in FIG. 1, agent 130 installed and running on user device 110 (e.g., laptop, mobile phone, tablet, point of sale device, etc.) can act as a pivot point. The SAAS environment 150 can have target systems listed which the user can select (e.g. via browser or portal 140). In response to receiving a selection of a target system from the user, the agent 130 can communicate with the SAAS platform 170. The actual connection could be established not from the user agent 130, but instead established from the SAAS platform 170 and routed back through the user agent 130. This separates the initiation of the connection from the end user machine 110, even though the end user machine 110 is being used as a route path.

In accordance with various embodiments, the agent 130 can automatically connect to the SAAS platform 170 (e.g., using a tunnel or other communication channel that allows private communications over a public network). The agent 130 can create a system ID and transfer that system ID to the SAAS platform 170 to the tunnel, which can validate the ID. In some embodiments, SAAS platform 170 acts as an identity provider (IDP) for the various target systems. As an IDP for the target systems, the SAAS platform 170 has a trust relationship with the target systems to provide credentials/assertions for authenticating users without requiring the user to provide a password (described below). Once a user is authenticated, access can be granted to retrieve credentials/assertions from the SAAS platform 170.

In some embodiments, the user (e.g., an administrator) can select a PAM or CASB target (e.g., firewall, web application, etc.) from portal 140. Any connection made from portal 140 can send the connection details to agent 130 corresponding to the system ID. The SAAS platform 170 can send TCP socket connection information to the agent. When the agent 130 detects a connection response, the agent 130 can inject the credentials/assertions from the SAAS platform 170. Upon completion, the credentials can be wiped from memory. In some embodiments, optional client-side VPN 180 can be used to create a client end to end WAN or LAN 190.

The specific connection details between the portal, platform, and target device may be accomplished using a variety of techniques that may depend on the topology of the network and security agent. For example, the security agent may be a distributed security agent running on each client device 110A-110N or the security agent may be acting as a gateway device.

Figure 2:
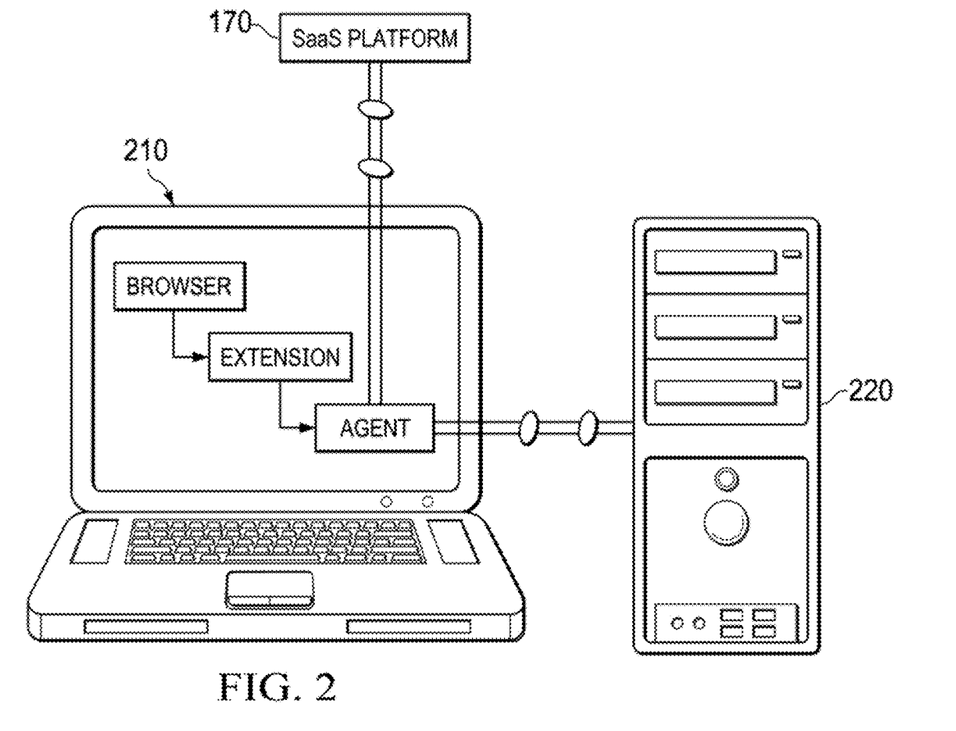
FIG. 2 illustrates a security agent installed on an endpoint device that may be used in one or more embodiments of the present technology.

FIG. 2 illustrates a security agent installed on an endpoint device 210 that may be used in one or more embodiments of the present technology. As illustrated in FIG. 2, endpoint device 210 has a browser, an extension, and a security agent installed thereon. When a connection is requested by the user, the browser (or portal) can reach out to the browser extension. The extension can then reach out to the agent and request that the agent initiate a path to the target 220 (a target network component). As discussed in more detail below, the agent requests credentials or an assertion for the user relating to the requested target 220. In response, the SAAS platform 170 provides the credentials/assertion to the agent. In some embodiments, at no time does the user have direct access to the credentials/assertion. Rather, the agent provides the user with "fake" or abstracted credentials/assertion, as well as an abstracted session identifier. When sending requests and receiving responses from the target WebUI, the browser will use the abstracted credentials/assertion and session identifier. The agent will inject the real credentials/assertion and session identifier when sending requests to the target WebUI, and likewise will inject the abstracted credentials/assertion and session identifier when forwarding responses to the browser/extension. In some embodiments, a proxy within the agent runs on the endpoint device 210, as illustrated in FIG. 2. In other embodiments, the proxy capabilities of the agent can run out side of the endpoint device (for example, at a centralized location) and can be shared by multiple users, even while the browser and extension remain on the endpoint device.

Figure 3:
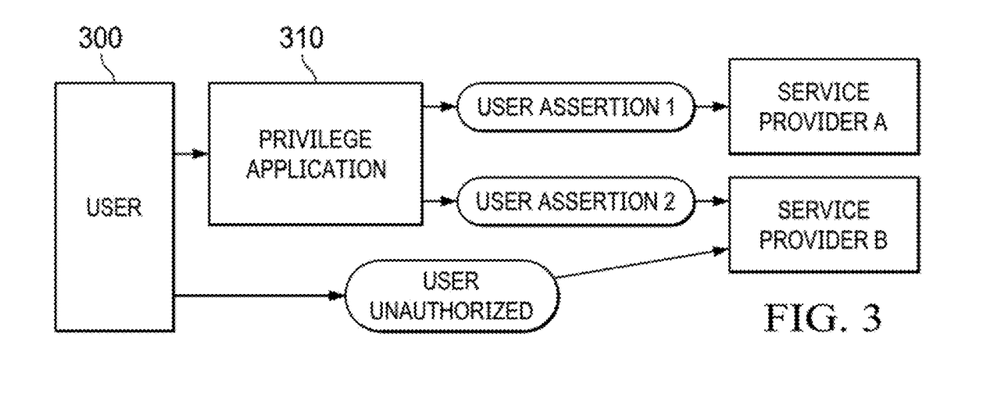
FIG. 3 is a block diagram illustrating a broad overview of the operation of the system and method.

FIG. 3 is a block diagram illustrating a broad overview of the operation of the system and method described herein. FIG. 3 shows a user 300 that desires to access one or more service providers (e.g., targets Service Provider A, Service Provider A, etc.) using a browser via the privilege application 310. The privilege application 310 serves as the IDP for the target(s) and inserts assertions (e.g., USER ASSERTION 1, USER ASSERTION 2, etc.) as needed to facilitate authentication. Once the browser is no longer the arbiter of SSO authentication, the privilege application can provide authentication for the user natively. The user may be authenticated via a user's corporate account, a secondary user account dedicated to the user but different from the corporate account, or for a service account, shared by many users, for example.

FIG. 3 also illustrates an example where the user 300 attempts to access Service Provider B without using privilege application 310. While the unauthorized user may be able send a request to Service Provider B, the user will not be authenticated by the IDP. They system is configured in such a way that if a user tries to bypass the platform to access the service provider directly (e.g., by opening a new browser tab or window), the user will not be authenticated, since the user/browser does not have access to the real credentials/assertion or the real session ID.

In some embodiments, the privilege application uses an agent component so that all authentication and session identification information is abstracted to the user and browser. The agent component maintains a mapping of abstracted authentication and session identification information and translates this information from abstracted information to real information and from real information to abstracted information as the requests and responses are proxied through the agent component (described in detail below).

Figure 4:
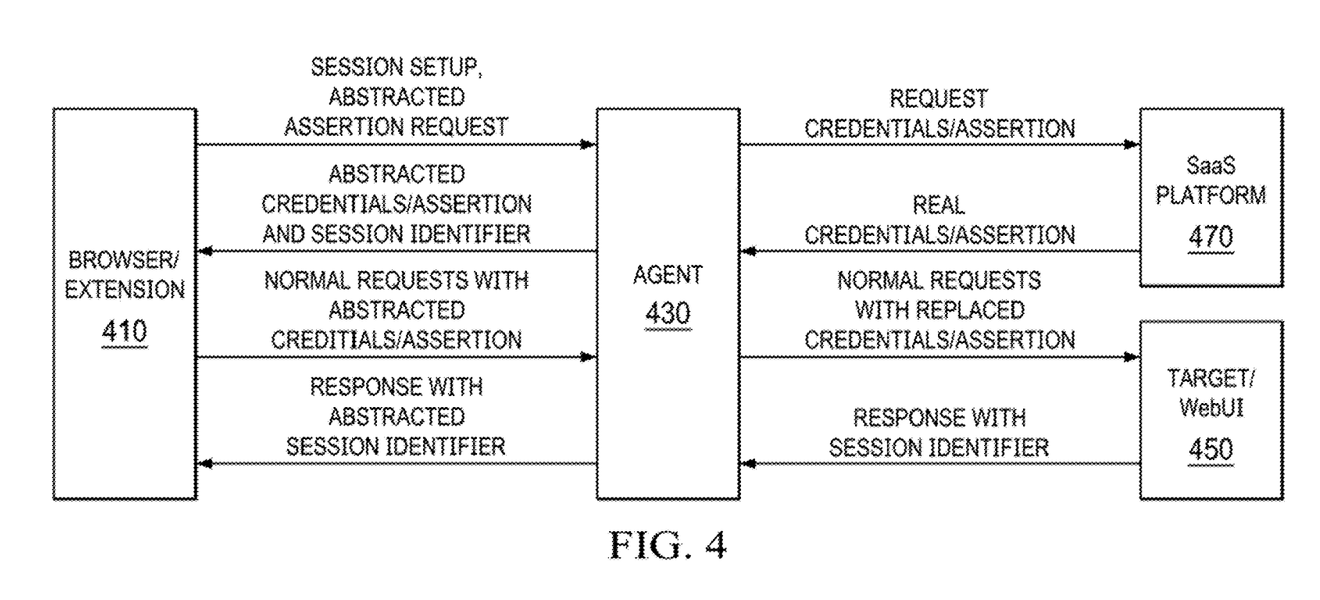
FIG. 4 is a block diagram illustrating the operation of the system and method.

FIG. 4 is a block diagram of a system, illustrating the operation of a user being authenticated to use a target WebUI. FIG. 4 shows browser/extension 410 (e.g., a browser and a browser extension installed on a computing device), agent 430 (e.g., software installed on the computing device or on another device), SaaS Platform 470 (e.g., an IDP), and a target/WebUI 450 (e.g., a SaaS service provider). As described above, a user of the computing device may desire to access the services of target/WebUI 450 through the user's computer, on which the browser/extension 410 is installed.

In some examples, the user may be provided with an interface that enables the user to access one or more service providers. For example, the user's employer may provide users with access to several SaaS service providers and allow a user to access a respective service provider by clicking on a tile or button on a web page. When the user clicks on the tile corresponding to target/WebUI 450, the browser extension will initiate a session with agent 430 and send a request for an abstracted assertion. In response, the agent 430 will request credentials from SaaS platform 470, which is the IDP for the target 450. As mentioned above, as an IDP, the SaaS platform 470 has a trust with the target 450, such that if the IDP indicates that a user is authorized to access the target 470, the target 470 will provide access. Assuming that the user is authorized to access the target 450, the SaaS platform 470 will reply to the agent with the user's credentials/assertion. Note that authorization does not have to be provided on an individual basis. For example, in some examples, a user can be authorized as "an employee of XYZ," etc. In some embodiments, the received credentials are cached by the agent in volatile memory (non-persisted). The credentials may be flushed from the cache, once they are no longer needed. For example, the agent may be configured to flush the cache after the credentials are provided to the target. In another example, the cache can be flushed once the browser main window is closed. Other examples are also possible.

As discussed, the real credentials/assertion are not provided to the browser/extension 410. Rather, the agent provides the extension 410 with abstracted (fake) credentials/assertion, and a session identifier. From the point of view of the browser/extension, the abstracted credentials can be used in a normal manner, as if they were real. Similarly, when communicating with the target through the agent, from the point of view of the browser/extension, it appears to be communicating directly with the target.

Once the browser/extension 410 receives the abstracted credentials/assertion and the session identifier, the user can begin using the services of the target 450 by sending requests and receiving responses. When generating a request, the browser/extension 410 includes the abstracted credentials/assertion and sends the request through the agent 430. The agent 430 will replace the abstracted credentials/assertion with the real credentials/assertion, and forward the request to the target 450. The target 450 will reply to the agent with a response and a session identifier. The reply from the target 450 may also typically include response headers and cookies.

The agent then forwards the response to the browser/extension 410, but replaces the session identifier, response header, and cookies with an abstracted session identifier, an abstracted response header, and abstracted cookies. Like with the credentials, the browser and user do not have access to the real session identifier, real response headers, or real cookies. This prevents the user, or a hacker, from simply opening a new browser tab or window and communicating directly with the target service provider without the knowledge of the agent, since it only has access to the abstracted information, which the target will not recognize. Note that a new tab or window can be opened (e.g., during normal use of the service), as long as communications still pass through the agent 430.

Figure 5A:
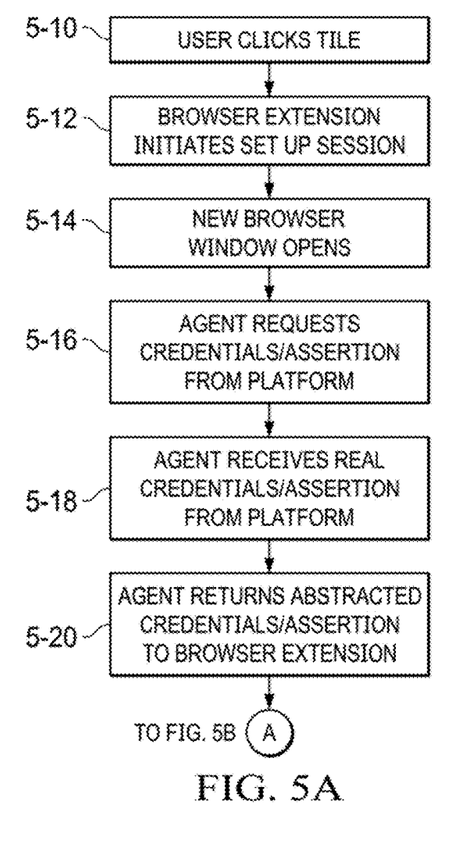
FIGS. 5A-5B are flowcharts depicting a process of authenticating a user and communicating with a service provider.
Figure 5B:
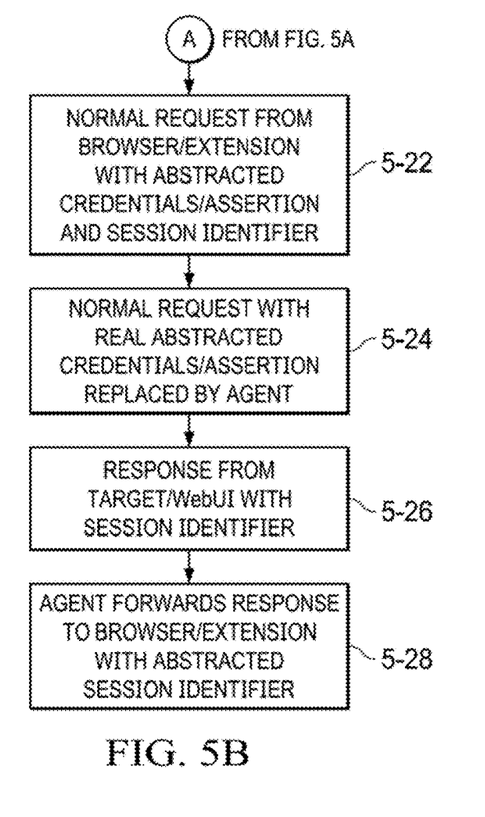

FIGS. 5A-5B are flowcharts depicting an example of a process of authenticating a user and communicating with a service provider. In this example, a user desires to use the services of a service provider, for which the user is authorized, according to the authentication system described above. At step 5-10, the user initiates the process, for example, by clicking on a tile or button (corresponding to the desired service provider) on a web interface. In response, at step 5-12, the browser extension will initiate a set up session, and a new browser window will open (5-14). At step 5-16, the agent sends a request to the SaaS platform for credentials/assertion corresponding to the user. In response, at step 5-18, the SaaS platform will reply to the agent with the user's credentials/assertion. At step 5-20, the agent provides the extension with abstracted credentials/assertion, and an abstracted session identifier. From the point of view of the browser/extension, the abstracted credentials can be used in a normal manner, as if they were real. Similarly, when communicating with the target through the agent, from the point of view of the browser/extension, it appears to be communicating directly with the target. At this point, the browser/extension has everything it needs to begin communicating (via the agent) with the desired service provider.

At step 5-22 of FIG. 5B, the browser/extension generates a normal service provider request, including the abstracted credentials/assertion and abstracted session identifier and sends the request to the agent. At step 5-24, the agent replaces the abstracted credentials/assertion with the real credentials/assertion and replaces the abstracted session identifier with the real session identifier, and forwards the request to the target. At step 5-26, the target will reply to the agent with a response to the request. The response may also include a session identifier, response headers, and one or more cookies. At step 5-28, the agent forwards the response to the browser/extension, but replaces the real session identifier with an abstracted session identifier. The agent will also replace the real response headers and real cookies with abstracted headers and cookies. Like with the credentials, the browser and user do not have access to the real session identifier, headers and cookies. This prevents the user, or a hacker, from simply opening a new browser tab or window and communicating directly with the target service provider, since it only has access to the abstracted session identifier, abstracted headers, and abstracted cookies, which the target will not recognize. From this point onward, the browser/extension can generate additional requests for the target, using the abstracted session identifier, abstracted response headers, and abstracted cookies, which the agent will translate, prior to forwarding the request to the target.

Aspects and implementations of the system and method of this disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 6:
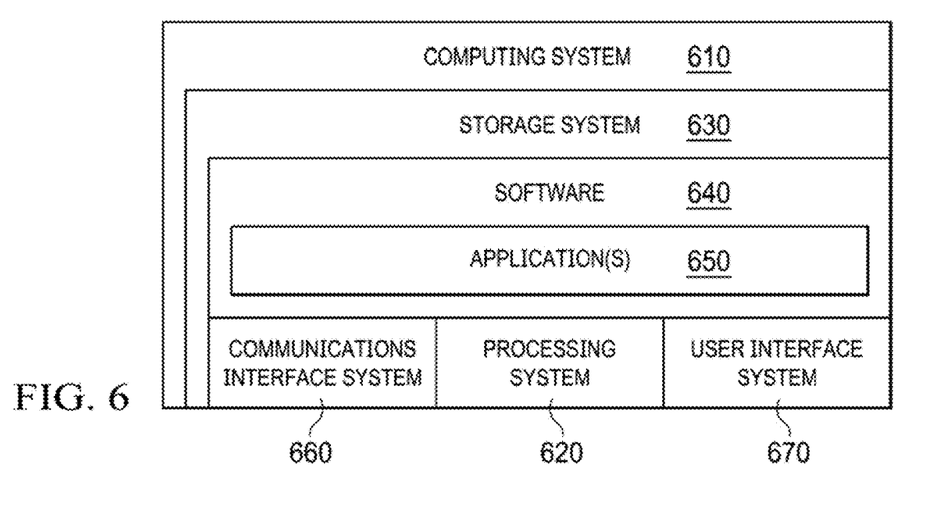
FIG. 6 is an example of a computer system that may be used in some embodiments of the present technology.

FIG. 6 illustrates computing system 610, which is representative of any system or collection of systems in which the various applications, services, scenarios, and processes disclosed herein may be implemented. For example, computing system 610 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 610 may be implemented as a single apparatus, system, or device or may be implemented in a distributed manner as multiple apparatuses, systems, or devices. Computing system 610 includes, but is not limited to, processing system 620, storage system 630, software 640, applications 650, communication interface system 660, and user interface system 670. Processing system 620 is operatively coupled with storage system 630, communication interface system 660, and an optional user interface system 670.

Processing system 620 loads and executes software 640 from storage system 630. When executed by processing system 620 for deployment of scope-based certificates in multi-tenant cloud-based content and collaboration environments, software 640 directs processing system 620 to operate as described herein for at least the various processes, operational scenarios, and sequences discussed in the foregoing implementations. Computing system 610 may optionally include additional devices, features, or functionality not discussed for purposes of brevity.

Referring still to FIG. 6, processing system 620 may comprise a micro-processor and other circuitry that retrieves and executes software 640 from storage system 630. Processing system 620 may be implemented within a single processing device, but may also be distributed across multiple processing devices or sub-systems that cooperate in executing program instructions. Examples of processing system 620 include general purpose central processing units, application specific processors, and logic devices, as well as any other type of processing device, combinations, or variations thereof.

Storage system 630 may comprise any computer readable storage media readable by processing system 620 and capable of storing software 640. Storage system 630 may include volatile and nonvolatile, removable and non-removable media implemented in any method or technology for storage of information, such as computer readable instructions, data structures, program modules, or other data. Examples of storage media include random access memory, read only memory, magnetic disks, nonvolatile memory, battery backed memory, Non-Volatile DIMM memory, phase change memory, memristor memory, optical disks, flash memory, virtual memory and non-virtual memory, magnetic cassettes, magnetic tape, magnetic disk storage or other magnetic storage devices, or any other suitable storage media.

In addition to computer readable storage media, in some implementations storage system 630 may also include computer readable communication media over which at least some of software 640 may be communicated internally or externally. Storage system 630 may be implemented as a single storage device, but may also be implemented across multiple storage devices or sub-systems co-located or distributed relative to each other. Storage system 630 may comprise additional elements, such as a controller, capable of communicating with processing system 620 or possibly other systems.

Software 640 may be implemented in program instructions and among other functions may, when executed by processing system 620, direct processing system 620 to operate as described with respect to the various operational scenarios, sequences, and processes illustrated herein. For example, software 640 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 640 may include additional processes, programs, or components, such as operating system software, virtual machine software, or application software. Software 640 may also comprise firmware or some other form of machine-readable processing instructions executable by processing system 620.

In general, software 640 may, when loaded into processing system 620 and executed, transform a suitable apparatus, system, or device (of which computing system 610 is representative) overall from a general-purpose computing system into a special-purpose computing system. Indeed, encoding software on storage system 630 may transform the physical structure of storage system 630. The specific transformation of the physical structure may depend on various factors in different implementations of this description. Examples of such factors may include, but are not limited to, the technology used to implement the storage media of storage system 630 and whether the computer-storage media are characterized as primary or secondary storage, as well as other factors.

For example, if the computer readable storage media are implemented as semiconductor-based memory, software 640 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 660 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 670 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 670. In some cases, the input and output devices may be combined in a single device, such as a display capable of displaying images and receiving touch gestures. The aforementioned user input and output devices are well known in the art and need not be discussed at length here. In some cases, the user interface system 670 may be omitted when the computing system 610 is implemented as one or more server computers such as, for example, blade servers, rack servers, or any other type of computing server system (or collection thereof).

User interface system 670 may also include associated user interface software executable by processing system 620 in support of the various user input and output devices discussed above. Separately or in conjunction with each other and other hardware and software elements, the user interface software and user interface devices may support a graphical user interface, a natural user interface, an artificial intelligence (AI) enhanced user interface that may include a virtual assistant or bot (for example), or any other type of user interface, in which a user interface to an imaging application may be presented.

Communication between computing system 610 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A method of providing access to a client to facilitate connections to target network components, the method comprising:
   responsive to receiving a request from a user device to access to a target network component, providing, by an agent component, abstracted credentials to the user device;
   generating, by the user device, a first request intended for the target network component, the request including the abstracted credentials;
   generating, by the agent component, a second request based on the first request by replacing the abstracted credentials with user credentials;
   sending the second request to the target network component;
   receiving, by the agent component, a first response from the target network component, the first response including a session identifier;
   generating, by the agent component, a second response based on the first response by replacing the session identifier with an abstracted session identifier; and
   sending the second response to the user device.

2. The method of claim 1, wherein the user device communicates with the agent via a browser extension installed on the user device.

3. The method of claim 1, wherein the abstracted session identifier comprises an abstracted response header.

4. The method of claim 1, wherein the abstracted session identifier comprises an abstracted cookie.

5. The method of claim 1, further comprising storing, by the agent component, the user credentials in a non-persistent cache.

6. The method of claim 5, further comprising flushing the non-persistent cache after sending the second request to the target network component.

7. The method of claim 1, further comprising wherein the first response is received from the target network component without the target network component requiring a password.

8. A system for providing access to a client to facilitate connections to target network components, the system comprising:

a processor; and a non-transitory computer readable medium storing instructions translatable by the processor, the instructions when translated by the processor perform:
- responsive to receiving a request from a user device to access to a target network component, providing, by an agent component, abstracted credentials to the user device
- generating, by the user device, a first request intended for the target network component, the request including the abstracted credentials;
- generating, by the agent component, a second request based on the first request by replacing the abstracted credentials with user credentials;
- sending the second request to the target network component;
- receiving, by the agent component, a first response from the target network component, the first response including a session identifier;
- generating, by the agent component, a second response based on the first response by replacing the session identifier with an abstracted session identifier; and
- sending the second response to the user device.

9. The system of claim 8, wherein the user device communicates with the agent via a browser extension installed on the user device.

10. The system of claim 8, wherein the abstracted session identifier comprises an abstracted response header.

11. The system of claim 8, wherein the abstracted session identifier comprises an abstracted cookie.

12. The method of claim 8, further comprising storing, by the agent component, the user credentials in a non-persistent cache.

13. The method of claim 12, further comprising flushing the non-persistent cache after sending the second request to the target network component.

14. The method of claim 8, further comprising wherein the first response is received from the target network component without the target network component requiring a password.

15. A computer program product comprising a non-transitory computer readable medium storing instructions translatable by a processor, the instructions when translated by the processor perform, in an enterprise computing network environment:
- responsive to receiving a request from a user device to access to a target network component, providing, by an agent component, abstracted credentials to the user device
- generating, by the user device, a first request intended for the target network component, the request including the abstracted credentials;
- generating, by the agent component, a second request based on the first request by replacing the abstracted credentials with user credentials;
- sending the second request to the target network component;
- receiving, by the agent component, a first response from the target network component, the first response including a session identifier;
- generating, by the agent component, a second response based on the first response by replacing the session identifier with an abstracted session identifier; and
- sending the second response to the user device.

16. The computer program product of claim 15, wherein the user device communicates with the agent via a browser extension installed on the user device.

17. The computer program product of claim 15, wherein the abstracted session identifier comprises an abstracted response header.

18. The computer program product of claim 15, wherein the abstracted session identifier comprises an abstracted cookie.

19. The computer program product of claim 15, further comprising storing, by the agent component, the user credentials in a non-persistent cache.

20. The computer program product of claim 19, further comprising flushing the non-persistent cache after sending the second request to the target network component.

* * * * *